(12) United States Patent
Early

(10) Patent No.: US 6,560,587 B1
(45) Date of Patent: May 6, 2003

(54) METHOD AND APPARATUS FOR CALCULATING CONFIDENCE INTERVALS

(75) Inventor: Thomas Alan Early, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/576,988

(22) Filed: May 23, 2000

Related U.S. Application Data

(60) Provisional application No. 60/171,429, filed on Dec. 22, 1999.

(51) Int. Cl.[7] .................................................. G06N 5/00
(52) U.S. Cl. ...................................... 706/45; 422/82.09
(58) Field of Search ............................... 706/45, 52, 12; 422/82.09

(56) References Cited

U.S. PATENT DOCUMENTS 6,463,391 B1 * 10/2002 Early ........................... 702/85
6,480,808 B1 * 11/2002 Early et al. ................. 702/179

OTHER PUBLICATIONS

Robert de Levie; How to Use Excel(R) in Analytical Chemistry (Ch. 6, Spectrometry, etc.); Feb. 2001; Cambridge.*
Jim Martindale; Calculators On–Line Center—Chemistry; Nov. 7, 2002; 1–105.*
"Calculating maximum likelihood, estimates of reliability parameters using spreadsheets", Lawson et al., Quality Engineering, 1998–1999, Marcel Dekker, USA, V. 11. No. 1, pp. 43–53.
"A user–friendly spreadsheet program for calibration using weighted regression", Gort et al., Chemometrics and Intelligent Laboratory Systems, NL, Elsevier Science Publishers, B.V. Amsterdam, V. 28, No. 1, Apr. 1, 1995, pp. 193–199.
"Exact confidence intervals for proportions based on a sample from a finite population", S.J. Turner, Collegiate Microcomputer Feb. 1993, USA, V. 11, No. 1, pp. 5–14.
International Search Report.

* cited by examiner

*Primary Examiner*—Wilbert L. Starks, Jr.
*Assistant Examiner*—Joseph P. Hirl
(74) *Attorney, Agent, or Firm*—Noreen C. Johnson; Philip D. Freedman

(57) ABSTRACT

An exemplary embodiment of the present invention is a method for calculating at least one confidence interval. The method comprises a set of instructions that activate a calculator. The user selects input data, which the calculator reformats to generate output data. The calculator then generates both a calibration summary and specific calibration summary containing calibration standard measurements from the output data. A linear calibration curve and residual calibration value plot are derived from these calibration standard measurements. The calculator calculates a back-calculated unknown sample value using the information gathered from the linear calibration curve and residual calibration value plot. The calculator can then calculate the confidence interval for the back-calculated unknown sample value.

15 Claims, 9 Drawing Sheets

FIG. 2

| Sample_ID | EL | Sam_Date | Sam_Time | Mean_ST | RSD | Mean_SA | ASP | Samp_Wt | Samp_Vol | Dilu | MeanAtHt |
|---|---|---|---|---|---|---|---|---|---|---|---|
| Sample004 | Hg | 12/25/97 | 12:24:47 | | 1.457 | | 4 | | 500 | | 0.125895 |
| Sample004 | Hg | 12/25/97 | 12:37:43 | | 1.29 | | 4 | | 500 | | 0.142647 |
| Sample004 | Hg | 12/25/97 | 13:03:59 | | 0.334 | | 4 | | 500 | | 0.151062 |
| Calib Blank | Hg | 12/25/97 | 13:07:25 | | 11.74 | | 1 | | 500 | | 0.00239 |
| 5 | Hg | 12/25/97 | 13:11:19 | | 0.944 | | 2 | | 500 | | 0.043328 |
| 104 | Hg | 12/25/97 | 13:15:17 | | 1.386 | | 3 | | 500 | | 0.081104 |
| -20 | Hg | 12/25/97 | 13:19:14 | | 0.321 | | 4 | | 500 | | 0.153677 |
| 30 | Hg | 12/25/97 | 13:23:13 | | 2.443 | | 5 | | 500 | | 0.225748 |
| 40 | Hg | 12/25/97 | 13:27:13 | | 1.316 | | 6 | | 500 | | 0.297069 |
| 20 | Hg | 12/25/97 | 13:31:12 | 20.44628 | 1.013 | 20.44628 | 7 | | 500 | | 0.155467 |
| 0 | Hg | 12/25/97 | 13:35:11 | -0.45081 | 10.75 | -0.45081 | 8 | | 500 | | 0.002397 |
| lppb | Hg | 12/25/97 | 13:39:09 | 0.621629 | 6.13 | 0.621629 | 9 | | 1 | | 0.010252 |
| 02431a | Hg | 12/25/97 | 13:43:02 | 21.13373 | 1.107 | 5177.764 | 10 | 0.2 | 1 | 49 | 0.160503 |
| 02431b | Hg | 12/25/97 | 13:46:57 | 21.55023 | 1.997 | 5279.805 | 11 | 0.2 | 1 | 49 | 0.163554 |
| 02434a | Hg | 12/25/97 | 13:50:52 | 21.55262 | 1.211 | 5280.391 | 12 | 0.2 | 1 | 49 | 0.163571 |
| 20 | Hg | 12/25/97 | 13:54:53 | 20.86265 | 0.811 | 20.86265 | 7 | | 500 | | 0.158517 |
| Calib Blank | Hg | 12/25/97 | 14:06:38 | | 180.6 | | 1 | | 500 | | 0.002453 |
| 5 | Hg | 12/25/97 | 14:10:32 | | 1.188 | | 2 | | 500 | | 0.046078 |
| 10 | Hg | 12/25/97 | 14:14:30 | | 0.506 | | 3 | | 500 | | 0.085253 |
| 20 | Hg | 12/25/97 | 14:18:29 | | 0.578 | | 4 | | 500 | | 0.16337 |
| 30 | Hg | 12/25/97 | 14:22:26 | | 0.492 | | 5 | | 500 | | 0.244148 |
| 40 | Hg | 12/25/97 | 14:26:26 | | 0.257 | | 6 | | 500 | | 0.31235 |
| tclp20.00 | Hg | 12/25/97 | 14:30:23 | 20.31139 | 1.789 | 20.31139 | 30 | | 500 | | 0.164127 |
| 20 | Hg | 12/25/97 | 14:34:21 | 20.38786 | 0.451 | 20.38786 | 7 | | 500 | | 0.164721 |
| 0 | Hg | 12/25/97 | 14:38:23 | -0.48134 | 1.462 | -0.48134 | 8 | | 500 | | 0.002515 |
| lppb | Hg | 12/25/97 | 14:42:21 | 0.57979 | 4.841 | 0.57979 | 9 | | 1 | | 0.010763 |
| 02431a | Hg | 12/25/97 | 14:46:13 | 20.72365 | 0.813 | 5077.294 | 10 | 0.2 | 1 | 49 | 0.167331 |
| 02431b | Hg | 12/25/97 | 14:50:08 | 21.5392 | 0.414 | 5277.104 | 11 | 0.2 | 1 | 49 | 0.17367 |
| 02434a | Hg | 12/25/97 | 14:54:04 | 21.44471 | 0.732 | 5253.954 | 12 | 0.2 | 1 | 49 | 0.172936 |
| tclp20.00 | Hg | 12/25/97 | 14:57:58 | 20.67 | 0.083 | 20.66999 | 30 | | 500 | | 0.166914 |
| 20 | Hg | 12/25/97 | 15:01:54 | 21.06328 | 0.152 | 21.06328 | 7 | | 500 | | 0.169971 |
| Calib Blank | Hg | 12/25/97 | 15:05:51 | | 62.26 | | 1 | | 500 | | 0.002692 |

FIG. 6

| Row# | Date-Time | Slope | Intercept | Std Error | R^2 | # Points | Xbar | SSx |
|---|---|---|---|---|---|---|---|---|
| 5 | 12/25/97 13:07 | 0.007325 | 0.005699 | 0.00232 | 0.999662 | 6 | 17.5 | 1187.5 |
| 18 | 12/25/97 14:06 | 0.007773 | 0.006256 | 0.004035 | 0.999093 | 6 | 17.5 | 1187.5 |
| 33 | 12/25/97 15:05 | 0.008117 | 0.006558 | 0.003218 | 0.999471 | 6 | 17.5 | 1187.5 |
| 49 | 12/25/97 16:09 | 0.008376 | 0.006097 | 0.002897 | 0.999597 | 6 | 17.5 | 1187.5 |
| 57 | 12/25/97 16:40 | 0.008593 | 0.007087 | 0.003647 | 0.999394 | 6 | 17.5 | 1187.5 |
| 88 | 12/25/97 18:43 | 0.008617 | 0.007642 | 0.004297 | 0.999163 | 6 | 17.5 | 1187.5 |

| Row# | Concentration | Obs | Calc | Resid |
|---|---|---|---|---|
| 5 | 0 | 0.00239 | 0.005699 | -0.00331 |
| 6 | 5 | 0.043328 | 0.042324 | 0.001004 |
| 7 | 10 | 0.081104 | 0.078949 | 0.002155 |
| 8 | 20 | 0.153677 | 0.152198 | 0.001478 |
| 9 | 30 | 0.225748 | 0.225448 | 0.0003 |
| 10 | 40 | 0.297069 | 0.298698 | -0.00163 |

FIG. 8

| Row# | Sample | Next | Date-Time | Calib. Row# | MeanAtHt | Calculated | Error | Unknown? |
|---|---|---|---|---|---|---|---|---|
| 11 | 20 | | 1/1/98 13:31 | 2 | 0.15546727 | 20.44628007 | 0.3431741 | |
| 12 | 0 | | 1/1/98 13:35 | 2 | 0.00239665 | -0.450806958 | 0.379810673 | |
| 13 | 1ppb | | 1/1/98 13:39 | 2 | 0.01025222 | 0.621629607 | 0.37563383 | |
| 14 | 02431a | 15 | 1/1/98 13:43 | 2 | 0.16050285 | 21.1337337 | 0.343730401 | Yes |
| 15 | 02431b | | 1/1/98 13:46 | 2 | 0.16355365 | 21.55022664 | 0.344123437 | Yes |
| 16 | 02434a | | 1/1/98 13:50 | 2 | 0.16357117 | 21.55261846 | 0.344125816 | Yes |
| 17 | 20 | | 1/1/98 13:54 | 2 | 0.15851715 | 20.86264741 | 0.343497261 | |
| 24 | tclp20.00 | | 1/1/98 14:30 | 3 | 0.16412681 | 20.31139383 | 0.562311326 | |
| 25 | 20 | | 1/1/98 14:34 | 3 | 0.16472112 | 20.387855688 | 0.562399255 | |
| 26 | 0 | | 1/1/98 14:38 | 3 | 0.00251503 | -0.4813339862 | 0.622715911 | |
| 27 | 1ppb | | 1/1/98 14:42 | 3 | 0.01076268 | 0.579790645 | 0.615930616 | |

FIG. 9

| Samples | Concentration (ppb) | Error | Wt. (mg) | 95% PI | 99% PI |
|---|---|---|---|---|---|
| 02431a & 02431b | 21.34 | 0.26 | 5.23 | 0.18 | 0.29 |
| 02431a | 21.55 | 0.34 | 5.28 | 0.23 | 0.39 |
| 02431a & 02431b | 21.13 | 0.43 | 5.18 | 0.29 | 0.48 |
| 02434a & 02434b | 20.76 | 0.33 | 5.09 | 0.22 | 0.37 |
| 02437a & 02440b | 21.01 | 0.33 | 5.15 | 0.22 | 0.37 |
| 02440a & 02440b | 20.31 | 0.35 | 4.98 | 0.24 | 0.39 |
| 02443a & 02443b | 20.80 | 0.35 | 5.10 | 0.24 | 0.39 |
| 02446a & 02446b | 21.49 | 0.35 | 5.26 | 0.24 | 0.39 |
| 02449a & 02449b | 20.64 | 0.35 | 5.06 | 0.24 | 0.39 |
| 02652a & 02652b | 20.18 | 0.35 | 4.94 | 0.24 | 0.39 |
| 02657a & 02657b | 20.59 | 0.35 | 5.04 | 0.24 | 0.39 |
| 02662a & 02662b | 20.11 | 0.41 | 4.93 | 0.28 | 0.46 |

METHOD AND APPARATUS FOR CALCULATING CONFIDENCE INTERVALS

The present application claims benefit of U.S. Provisional Application Ser. No. 60/171,429, entitled "Method and Apparatus for Calculating Confidence Intervals", filed on Dec. 22, 1999 in the name of Early.

A portion of the disclosure of this patent document contains material that is subject to copyright protection. The copyright owner has no objection to the facsimile production by any one of the patent disclosure, as it appears in the Patent and Trademark Office files or records, but otherwise reserves all copyrights rights whatsoever.

The present application is related to copending U.S. patent application Ser. No. 09/576,680, entitled "Method and Apparatus for Calculating Confidence Intervals," filed on May 23, 2000 in the name of Early et al., copending U.S. patent application Ser. No. 09/576,688, entitled "Method and Apparatus for Calculating Confidence Intervals," filed on May 23, 2000 in the name of Early, and copending U.S. patent application Ser. No. 09/617,940, entitled "Method of Confidence Scoring," filed on Aug. 25, 2000 in the name of Wakeman et al.

BACKGROUND OF THE INVENTION

This invention relates to prediction interval calculators and, more particularly, to a prediction interval calculator that performs a complete statistical analysis of the output of an atomic absorption instrument in accordance with Six Sigma.

With the advent of the worldwide marketplace and the corresponding consumer demand for highly reliable products, quality has become an increasingly important issue. The quality of a company's product line can therefore play a decisive role in determining the company's reputation and profitability. As a result of this pressure for defect-free products, increased emphasis is being placed on quality control at all levels; it is no longer just an issue with which quality control managers are concerned. This has led to various initiatives designed to improve quality, such as the Total Quality Management (TQM) and the Six Sigma quality improvement programs. An overview of the Six Sigma program is presented by Mikel J. Harry and J. Ronald Lawson in "Six Sigma Producibility Analysis and Process Characterization," Addison Wesley Publishing Co., pp. 1-1 through 1-4 5, 1992. The Six Sigma process is also thoroughly discussed by G. J. Hahn, W. J. Hill, R. W. Hoerl, and S. A. Zinkgraf in "The Impact of Six Sigma Improvement—A Glimpse into the Future of Statistics", The American Statistician, 53, 3, August, pages 208–215; and by G. J. Hahn, N. Doganaksoy, and R. Hoerl in "The Evolution of Six Sigma", to appear in Quality Engineering, March 2000 issue.

Six Sigma analysis is a data driven methodology to improve the quality of products and services delivered to customers. Decisions made regarding direction, interpretation, scope, depth or any other aspect of quality effort should be based on actual data gathered, and not based on opinion, authority or guesswork. Key critical-to-quality (CTQ) characteristics are set by customers. Based on those CTQs, internal measurements and specifications are developed in order to quantify quality performance. Quality improvement programs are developed whenever there is a gap between the customer CTQ expectations and the current performance level.

The basic steps in a quality improvement project are first to define the real problem by identifying the CTQs and related measurable performance that is not meeting customer expectations. This real problem is then translated into a statistical problem through the collection of data related to the real problem. By the application of the scientific method (observation, hypothesis and experimentation), a statistical solution to this statistical problem is arrived at. This solution is deduced from the data through the testing of various hypotheses regarding a specific interpretation of the data. Confidence (prediction) intervals provide a key statistical tool used to accept or reject hypotheses that are to be tested. The arrived at statistical solution is then translated back to the customer in the form of a real solution.

In common use, data is interpreted on its face value. However, from a statistical point of view, the results of a measurement cannot be interpreted or compared without a consideration of the confidence that measurement accurately represents the underlying characteristic that is being measured. Uncertainties in measurements will arise from variability in sampling, the measurement method, operators and so forth. The statistical tool for expressing this uncertainty is called a confidence interval depending upon the exact situation in which the data is being generated.

Confidence interval refers to the region containing the limits or band of a parameter with an associated confidence level that the bounds are large enough to contain the true parameter value. The bands can be single-sided to describe an upper or lower limit or double sided to describe both upper and lower limits. The region gives a range of values, bounded below by a lower confidence limit and from above by an upper confidence limit, such that one can be confident (at a pre-specified level such as 95% or 99%) that the true population parameter value is included within the confidence interval. Confidence intervals can be formed for any of the parameters used to describe the characteristic of interest. In the end, confidence intervals are used to estimate the population parameters from the sample statistics and allow a probabilistic quantification of the strength of the best estimate.

In the case of the invention described herein, the calculated prediction intervals describe a range of values which contain the actual value of the sample at some given double-sided confidence level. For example, the present invention allows the user to change a statistically undependable statement, "There is 5.65 milligrams of Hg in sample X", to, "There is 95% confidence that there is 5.65+/−0.63 milligrams of Hg in sample X". A prediction interval for an individual observation is an interval that will, with a specified degree of confidence, contain a randomly selected observation from a population. The inclusion of the confidence interval at a given probability allows the data to be interpreted in light of the situation. The interpreter has a range of values bounded by an upper and lower limit that is formed for any of the parameters used to describe the characteristic of interest. Meanwhile and at the same time, the risk associated with and reliability of the data is fully exposed allowing the interpreter access to all the information in the original measurement. This full disclosure of the data can then be used in subsequent decisions and interpretations of which the measurement data has bearing.

Current generation atomic absorption instruments use a linear calibration scheme to back calculate sample concentrations based on known calibration samples. After specifying acceptable tolerances for read back samples, a typical batch run may contain several calibrations performed during the course of the run. For example, calibration samples can be run a total of six times for a particular data set. Each sample concentration must then be back calculated for each calibration. However, the calculations routinely performed by these instruments do not calculate confidence intervals for the back calculations of each sample concentration.

To calculate these parameters can be cumbersome, even if a hand-held calculator is used. To avoid the inconvenience of using calculators, look-up tables are often used instead, in which the various parameters of interest are listed in columns and correlated with each other. Nevertheless, these tables do not provide the user with enough flexibility, e.g., it is generally necessary to interpolate between the listed values. Furthermore, the user is not presented information in a way that is interactive, so that a "feel" for the numbers and the relationship of the various quantities to each other is lost.

Accordingly, there is a particular need for a method and apparatus for calculating confidence intervals under Six Sigma.

BRIEF SUMMARY OF THE INVENTION

In an exemplary embodiment of the invention, a method for calculating confidence intervals-comprises a set of instructions that activate a calculator. The user selects input data, which the calculator reformats to generate output data. The calculator then generates both a calibration summary and specific calibration summary containing calibration standard measurements from the output data. A linear calibration curve and residual calibration value plot are derived from these calibration standard measurements. The calculator calculates a back-calculated unknown sample value using the information gathered from the linear calibration curve and residual calibration value plot. The calculator then calculates the confidence interval for the back-calculated unknown sample value.

In another exemplary embodiment of the invention, an apparatus comprises a set of instructions for calculating at least one confidence interval value.

These and other features and advantages of the present invention will be apparent from the following brief description of the drawings, detailed description, and appended claims and drawings.

BRIEF DESCRIPTION OF THE DRAWINGS

The invention will be further described in connection with the accompanying drawings in which:

FIG. 2 is the output data containing calibration standard values;

FIG. 6 is a worksheet containing the calibration summary;

FIG. 8 is an intermediate worksheet summarizing all non-calibration data of the output data; and FIG. 9 is a worksheet summarizing all of the unknown sample values.

DETAILED DESCRIPTION OF THE INVENTION

Generally, atomic absorption spectrophotometers contain procedures for processing atomic absorption PRN text files. The primary purpose of these procedures is to provide complete data analysis of all sample runs. Some of these calculations, such as the standard error and unknown sample weight, are routinely performed and output by the instrument, but some calculations required for Six Sigma analysis are not included in the data output.

Specifically, the invention utilizes procedures for calculating confidence intervals of predicted unknown sample concentrations or x values based on the unknown's y reading and the current calibration. These predicted unknown sample concentrations or x values are referred to as the back calculated x values of the unknown sample concentration.

Figure 1:
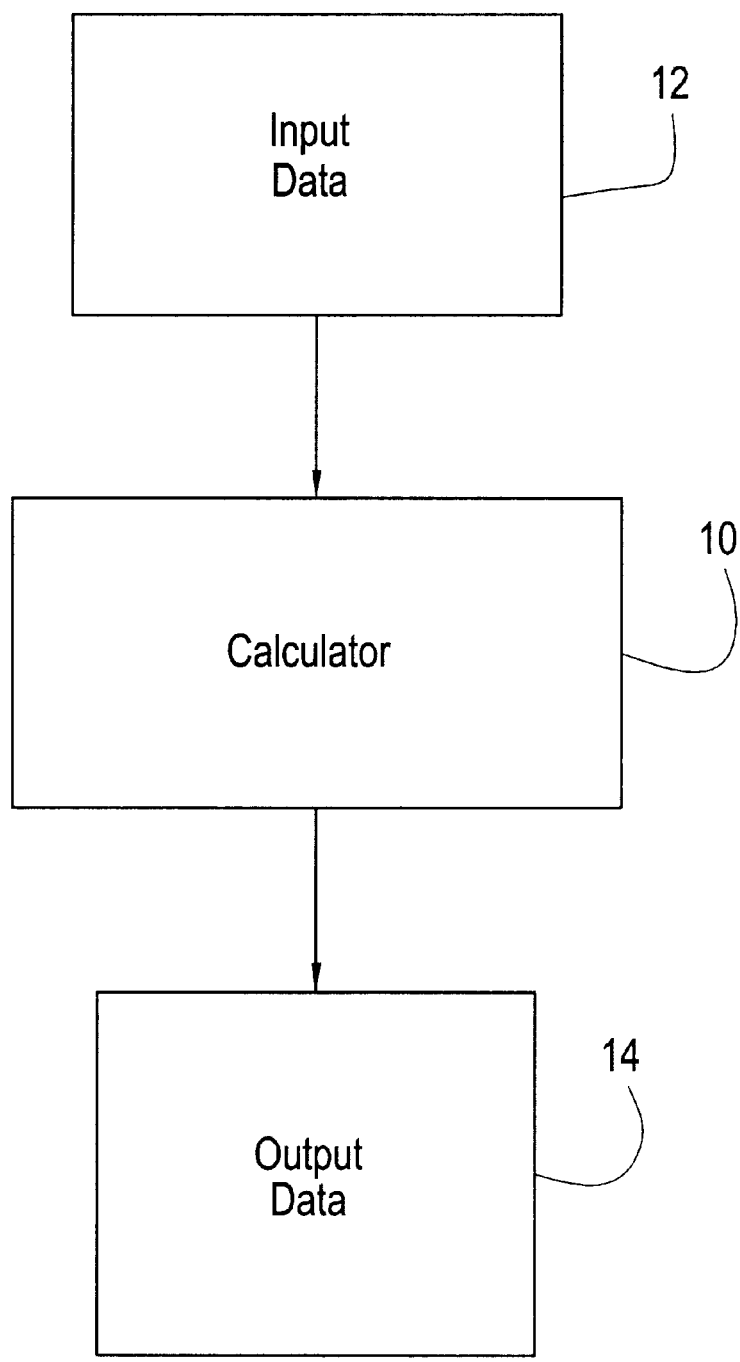
FIG. 1 is a flow chart depicting the calculator in operation.

Referring now to FIG. 1, a calculator 10 contains the procedures for processing input data 12 and generating output data 14. Input data 12 is a data file, which contains instrument readings of calibration and unknown samples. Output data 14 is a reformatted data file containing the requisite information to satisfy the input requirement of calculator 10.

Calculator 10 preferably is an Excel® workbook named "Hg Calculator.xls" or a macro of a spreadsheet program such as Excel®, Lotus®, or any Windows® based spreadsheet program. The exemplary embodiment of calculator 10 is that calculator 10 can be opened when needed or placed in an Excel® start directory, a Lotus® start directory, or any Windows® based spreadsheet program directory so that it will be read each time the program is started. A preferred exemplary embodiment of calculator 10 is a Mercury (Hg) calculator. Calculator 10 can work equally well with any element able to be determined by an atomic absorption spectrophotometer or analytical instrument that performs quantitative chemical analysis, and thus have an alternative exemplary embodiment for use with each element. In the preferred embodiment, calculator 10 processes input data 12 generated by Varian Atomic Absorption Spectrophotometers.

Referring now to FIG. 2, reformatted data file or output data 14 comprises the following parameters: Sample Identification column 16 ("Sample_ID"), Element column 18 ("EL", Sample Date column 20 ("Sam_Date"), Sample Time column 22 ("Sam_Time"), Mean Standard value column 24 ("Mean_ST"), Relative Standard Deviation column 26 ("RSD"), Mean Sample Concentration column 28 ("Mean_SA"), Auto Sampler Position column 30 ("ASP"), Sample Weight column 32 ("Samp_Wt"), Sample Volume column 34 ("Samp_Vol"), Dilution factor column 36 ("Dilu"), and MeanAtHt column 38. The parameters may change according to the specifications and requirements of the application for which the exemplary embodiment of the present invention is being used.

Sample_ID 16 contains the identifications for the calibration sample used. An identification 40 shown in Sample_ID 16 must be the actual concentration of the calibration sample in parts per billions (ppb). Mean standard value column 24, Relative Standard Deviation column 26 and Mean Sample Concentration column 28 contain values used for statistical analysis. The auto sampler position is included for internal reference to indicate that calibration samples are loaded first into the sample changer followed by the unknown samples or aliquots. An aliquot comprises a known fraction of a whole and constituting a sample. The sample weight value entered in Samp_Wt column 32 is the aliquot volume in milliliters. The value entered by the user in Dilu 36 is the final volume in milliliters. The value entered by the user in Samp_Vol 34 is the total volume of the unknown sample in liters.

When duplicate aliquots, also known as replicate calibrations, or unknown samples, are encountered such as in rows 13–14 containing "02431*a*" and "02431*b*" (FIG. 2), user should label each identification 40 with the same number followed by an "a" or "b" as shown. Another important feature of the exemplary embodiment of the present invention is that calculator 10 involves the calibration of the instrument using quality control samples (QC samples). QC samples are interpreted by the instrument and compared with the true value entered by the user. If the instrument is not calibrated correctly, then the instrument will dynamically recalibrate itself. Calculator 10 will intelligently comprehend the change in value of the recalibration data and recalculate the back-calculated x-value and the original weight of the unknown sample. QC samples are distinguished from unknown sample concentrations by either a blank entry such as a space 42 in a cell 44 or identification 40 of Sample_ID 16 must begin with the letters "QC". If neither case is true, then a row 46 will be treated as an unknown such as rows 5–9 in data file 14 (FIG. 2).

Figure 3:
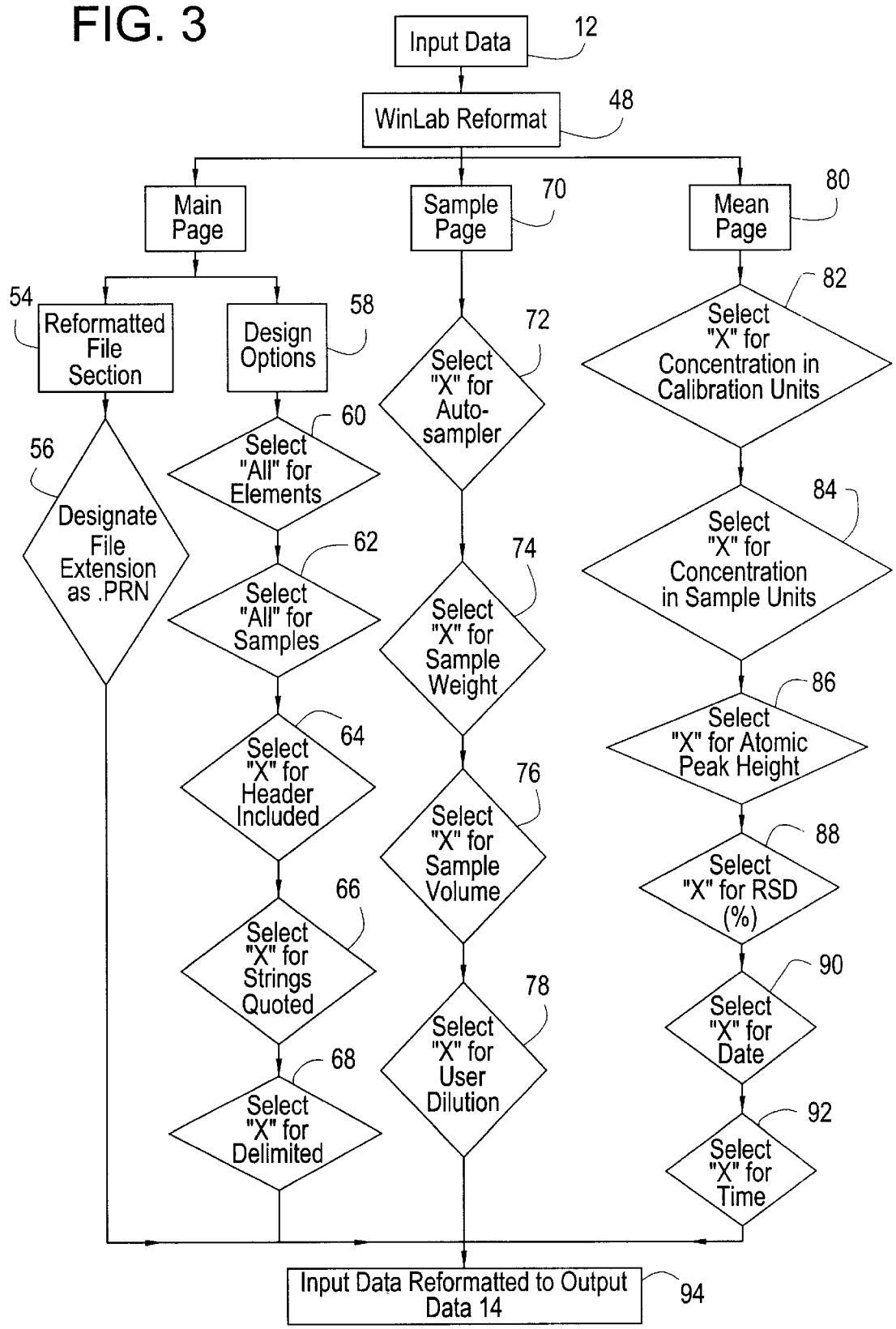
FIG. 3 is a flow chart illustrating how input data is reformatted to output data.

Referring now to FIG. 3, in the preferred embodiment user is prompted to select a "WinLab Reformat" 48 menu command to reformat input data 12. Input data 12 is reformatted to include additional data. The user must save this new format each time calculator 10 is used. WinLab Reformat 48 contains three separate menu commands that are involved with reformatting input data 12. The menu commands may change according to the specifications and requirements of the application for which the exemplary embodiment of the present invention is being used. Accordingly, the selections may change according to the specifications and requirements of the application for which the exemplary embodiment of the present invention is being used.

The user will first be prompted to make a number of selections at a Main page 52 of WinLab Reformat 48. Under Reformatted File section 54 at a function block 56 the user designates the reformatted file extension as .PRN (FIG. 3). Under Design Options section 58 at a function block 60, the user selects "All" for Elements. At a function block 62 the user selects "All" for Samples (FIG. 3). At a function block 64 the user selects "x" for Header Included. At a function block 66 the user selects "x" for Strings Quoted. At a function block 68 the user selects "x" for Delimited (FIG. 3).

The user will then be prompted to make a number of selections at a Sample Page 70 of WinLab Reformat 48. At a function block 72 the user selects "x" for Autosampler Location. At a function block 74 the user selects "x" for Sample Weight. At a function block 76 the user selects "x" for Sample Volume. At a function block 78 the user selects "x" for User Dilution (FIG. 3).

The user is then prompted to make a number of selections at a Mean page 80 of WinLab Reformat 48. At a function block 82 the user selects "x" for Concentration in Calibration Units. At a function block 84 the user selects "x" for Concentration in Sample Units. At a function block 86 the user selects "x" for Atomic Peak Height. At a function block 88 the user selects "x" for RSD (%). At a function block 90 the user selects "x" for Date. At a function block 92 the user selects "x" for Time (FIG. 3). After the user completes these selections, input data 12 is reformatted to output data 14 at a block 94.

Figure 4:
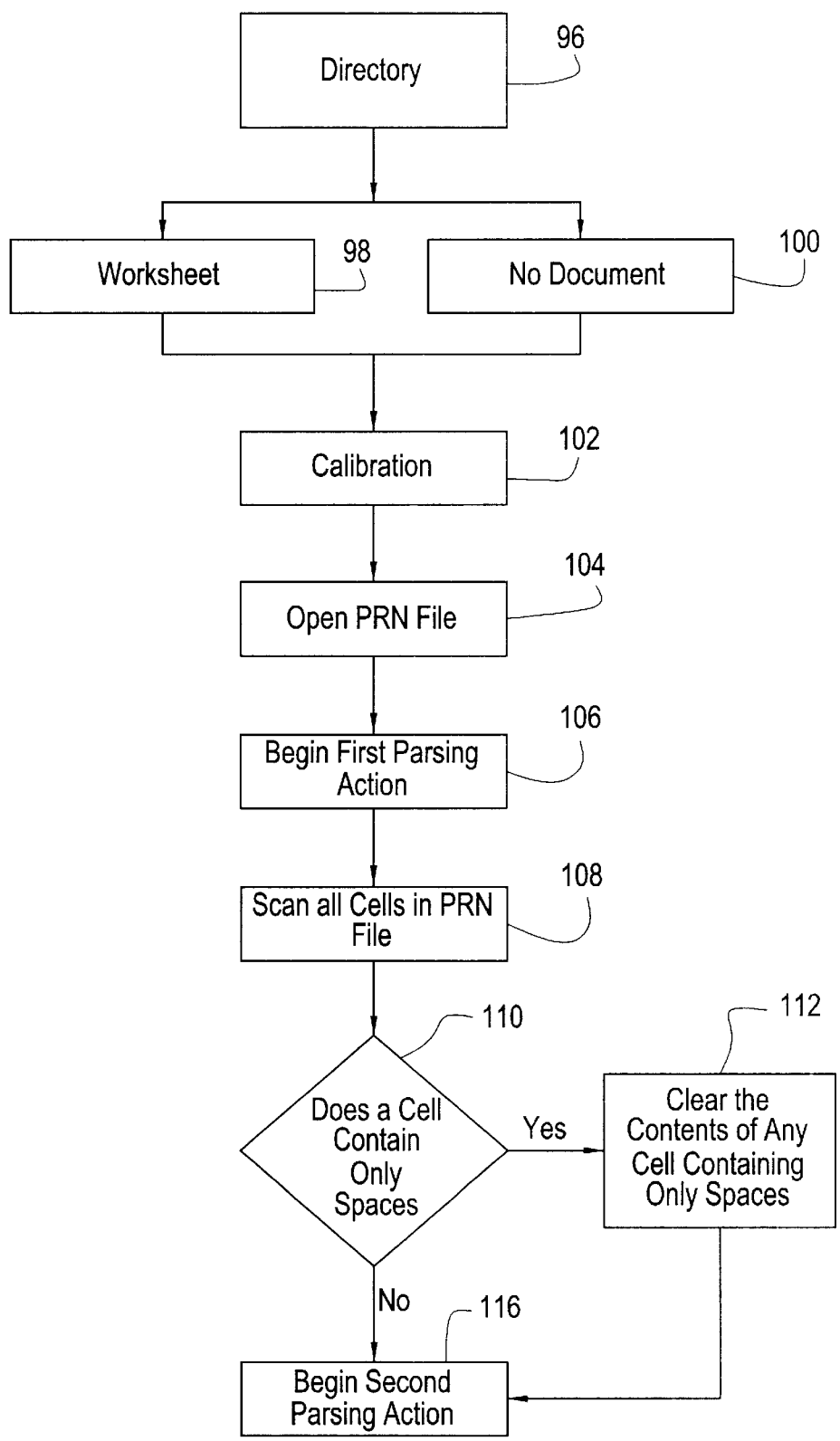
FIG. 4 is a flow chart illustrating the first parsing action or Open *.txt menu command.

Next, as shown in FIG. 4, the user will be prompted to a directory 96 containing either one or two selections entitled "Worksheet" 98 and/or "No Document" 100, respectively. In conjunction with the operation of calculator 10, a new Calibration menu item 102 (Calibration) will be located in either Worksheet 96 and/or No Document 98.

The user selects the reformatted data file or output data 14 using an Open PRN File 104 selection already having a "*.PRN" file filter in place. A first parsing action 106 ensures that all required columns are present in PRN file 12. If multiple columns have the same heading from the required set, then first parsing action 106 will warn the user and use the last found column. Open PRN File 104 is selected for the proper subsequent parsing of output file 14.

First parsing action 106 commences once the user selects output data 14. First parsing action 106 then performs a scan of all cells in output data 14 at a block 108. A function block 110 determines if cell 44 contains only space 42 (FIGS. 2). The scan clears the contents of any cell 44 containing only spaces 42 at a block 112. First parsing action 106 finishes when cell 44 does not contain only spaces 42 (FIG. 2). A second parsing action 116 then commences.

Figure 5:
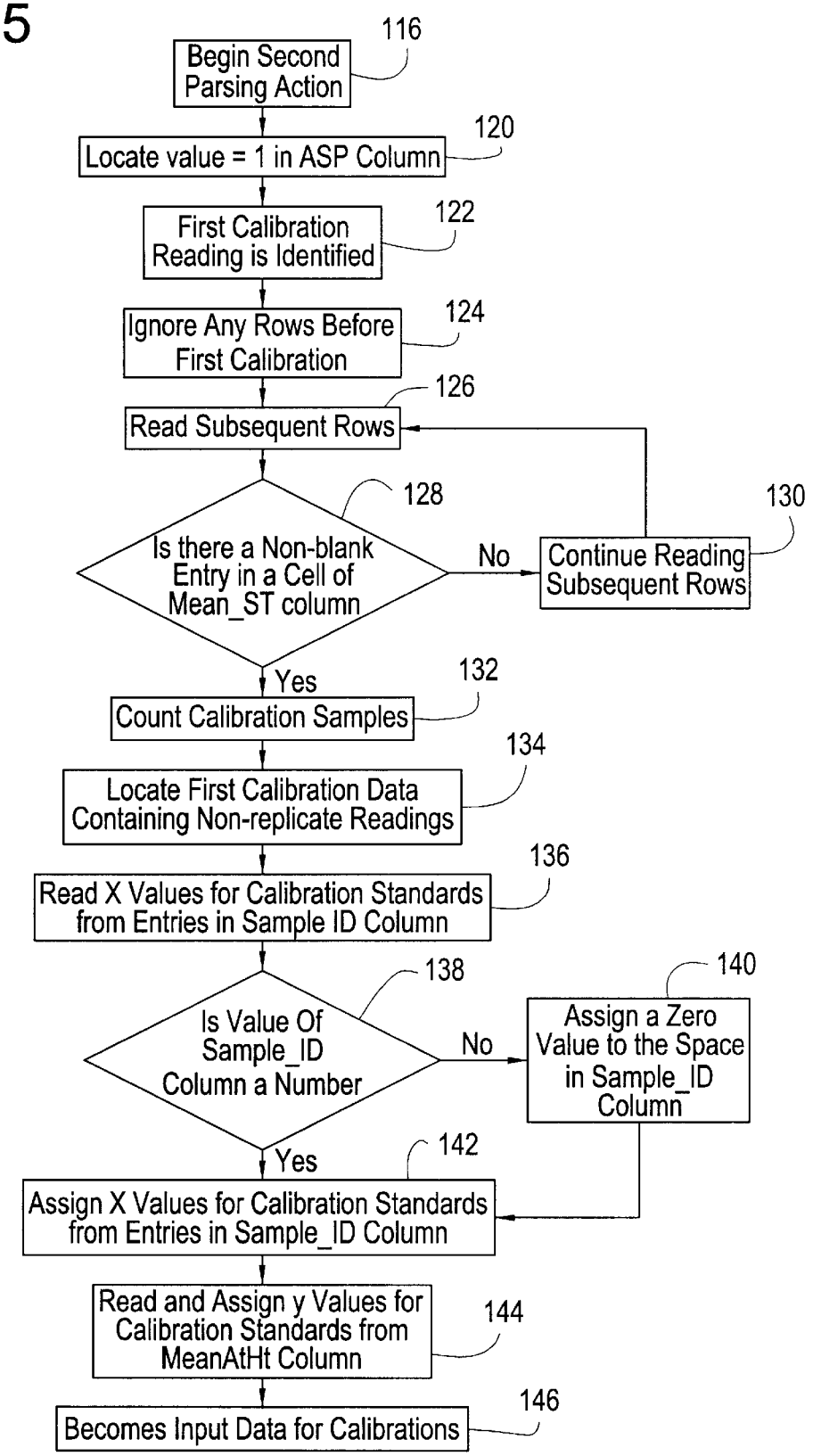
FIG. 5 is a flow chart illustrating the second parsing action or Processing *.txt menu command.

Referring now to FIG. 5, second parsing action 116, also known as the second menu command "Process", performs a series of manipulations of output data 14 by building several new worksheets as part of output data 14. Additional data is contained in the new worksheets so that calculator 10 may calculate confidence intervals in accordance with Six Sigma analysis.

A block 120 determines where the first calibration readings begin by locating a value of one (1) in cell 44 of ASP column 30. When a value of one is found, the first calibration reading is identified at a block 122. At a block 124 all rows before the first calibration reading are ignored. Those rows ignored at block 124 comprise all non-calibration sample data. The row containing the first calibration reading and rows subsequent thereto are then read at a block 126. A function block 128 determines if there is a non-blank entry in cell 44 of Mean_ST column 24. When function block 128 does not find a non-blank entry, a block 130 instructs second parsing action 116 to return to block 126 to continue reading subsequent rows. Once function block 128 finds a non-blank entry in cell 44 of Mean_ST column 24, the calibration samples are then counted at a block 132. A block 134 locates the first calibration data containing non-replicate readings. When block 134 locates the first calibration data containing non-replicate readings, the x values for the calibration standards are taken from Sample_ID column 16 at a block 136.

Next, a function block 138 determines if the value extracted from Sample_ID column 16 is a number. When function block 138 cannot interpret a number in value of Sample_ID column 16, a zero value will be assigned to that value at a block 140. For example, "Calib. Blank", "0 ppm" and/or "44 ppb" are values that cannot be interpreted as numbers. When the value extracted is a number, the x values for the calibration standards are assigned at a block 142. Next, the y values are assigned for the calibration standards from MeanAtHt column 38 at a block 144. Second parsing action 116 is completed at a block 146 once the x values and y values for the calibration standards have been read and assigned at blocks 142 and 144.

Referring now to FIG. 6, output data 14 now comprises the x and y values of calibration standards. Calculator 10 generates a new worksheet, referred to as calibration worksheet 148, utilizing output data 14. FIG. 6 illustrates an exemplary embodiment of calibration worksheet 148 containing calibration calculations from calibration standards that were run a total of six times.

Calibration worksheet 148 contains a calibration summary 150 and a specific calibration summary 152. Calibration summary 150 summarizes the fitting parameters for all calibration runs found in PRN file 12. Calibration summary 150 contains the following parameters: Row Number column 154, Date_time column 156, Slope column 158, Intercept column 160, Standard Error column 162, R-squared value column 164 ($R^2$), Number of Points column 165 (# of Points), X-bar column 166, and $SS_x$ column 167. Date_time column 156 allows the user to plot the time dependence of any of the calibration parameters. The parameters may change according to the specifications and requirements of the application for which the exemplary embodiment of the present invention is being used.

Specific value calibration summary 152 is found below calibration summary 150 and contains concentration column 168, observed value column 170, calculated column value 172, and residual column 174 for all calibration samples of a given run. Accordingly, the parameters may change according to the specifications and requirements of the application for which the exemplary embodiment of the present invention is being used. A new worksheet contains a calibration chart 175 and a drop-down control object 173 to select data from specific calibration summary 152.

Figure 7:
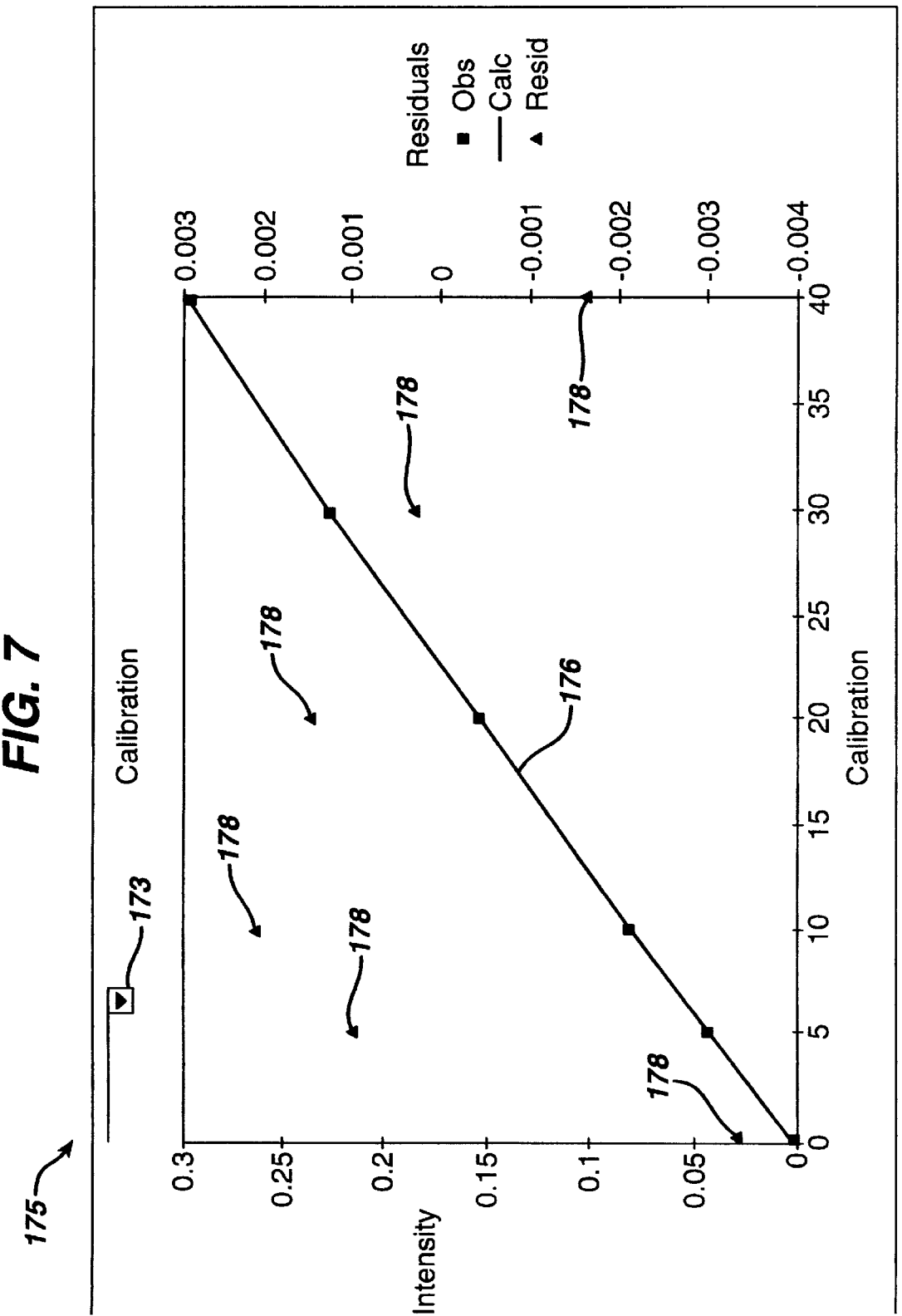
FIG. 7 is a graphic representation of the calibration summary listed in the worksheet of FIG. 6.

Referring now to FIG. 7, calibration chart 175 is a graphic representation of the specific calibration data listed in specific calibration summary 152 as well as values contained in slope column 158 and intercept column 160. The specific calibration data is plotted along the least square best line fit 176 along with the observed values. Residual differences are shown with a second value axis. A drop-down control box 173 is present to allow each of the calibrations in specific calibration summary 152 to be viewed. The values in drop down control box 173 are the starting row numbers found in Row Number column 154 for each calibration run found in output data 14.

At least one calibration residual value 177 is included for diagnostic purposes. The calibration residual value plot 178 assesses the quality of the linear relationship of the calibration data. If a non-linear relationship exists, then additional terms exist that were not gathered in the calibration of the instrument. The calibration residual value plot 178 will form a curvature indicating a discrepancy in the linear relationship. However, if a linear relationship exists, the calibration residual values 177 will always scatter around a value equal to zero.

Referring to FIG. 8, the next new worksheet generated by calculator 10 is an intermediate worksheet 180 referred to as "All Samples". Intermediate worksheet 180 is generated for internal requirements as well as consistency verification, which the user may want to perform. Each sample in intermediate worksheet 180 is treated independently so that replicate readings are not combined for an lower overall error. Intermediate worksheet 180 summarizes all non-calibration sample data in output data 14 that was ignored at block 124. Intermediate worksheet 180 contains the following parameters: Row Number column 182, Sample Identification column 184 (Sample), Next column 186, Date_Time column 188, Calibration Row Number column 190 (Calib. Row #), MeanAtHt value column 192 (MeanAtHt), Calculated value column 194, Error column 196, and Unknown column 198. Accordingly, the parameters may change according to the specifications and requirements of the application for which the exemplary embodiment of the present invention is being used.

Row Number column 182 lists the row number of the non-calibration sample data from input data 12. Next column 186 contains the next replicate data from the same sample such as in rows 27–28 (FIG. 2). Calibration Row Number column 190 contains the row number of the most recently run calibration as listed in Calibration 148. Calculated value column 194 contains a back-calculated x-value 200.

The error analysis performed is:

$$X = \frac{Y - b}{m},$$

(where m is the slope and b is the intercept of the correlation) is based on a linear correlation of the x and y values of a set of calibration standards. Through propagation of errors, the error in the back-calculated x-value ($S_x$) 200 is:

$$s_x = \frac{\sigma}{m}\sqrt{\frac{1}{N} + \frac{1}{M} + \frac{(X - \bar{x})^2}{(\sum (x_i - \bar{x}))^2}},$$

where σ (sigma) is the true product/process standard deviation or the standard error of the calibration fit. It is a combination of all influencing factors, including measurement, people, raw materials, etc. To find the true value of σ might take never-ending data collection. As a result, σ is estimated from sample data. N is the number of replicate readings of samples. The number of replicate readings N was determined at function block 134. Additional data, or larger the N value, will tighten the confidence interval and give a stronger and more accurate and precise representation of σ. M is the number of calibration samples. The number of calibration samples M is the value recorded by block 132. $x_i$ is the x value of M different calibrations samples. x is the average x value of the calibration samples. $S_x$ includes error from the calibration including covariance between the slope and intercept of the fit. The error determination of all non-calibration standards of output data 14 is terminated when a blank is encountered in the ASP column 30.

The error analysis is taken from *Applied Linear Statistical Models,* by John Neter, William Wasserman and Michael H. Kutner, Irwin, Chicago, Ill., 1996, and *Statistical Analysis in Chemistry and the Chemical Industry,* by Carl A. Bennett and Norman L. Franklin, John Wiley & Sons, New York, 1954.

Referring now to FIG. 9, a final worksheet 204, referred to as "Unknowns", is a summary of all data of unknown samples. Final worksheet includes the following parameters: Samples column 206, Concentration (ppb) (in parts per billion) column 208, Error column 210, Weight in milligrams column 212 (Wt. (mg)), 95% Prediction Interval column 214 (95% PI), and 99% Prediction Interval column 216 (99% PI). Accordingly, the parameters may change according to the specifications and requirements of the application for which the exemplary embodiment of the present invention is being used.

Unknown sample data can be identified by non-empty entries in Samp_Wt column 32, Samp_Vol column 34, and Dilu column 36 (FIG. 2). Replicate data of unknown samples is combined for an overall lower error calculation where N>1 and N is the number of replicate readings of unknown samples. Replicate sets of unknown sample data are recognized by the last letter found in Sample Identification column 16. In combining replicate sets of data, the x-values and y-values are averaged to generate an average x-value and an average y-value of the replicate sets of unknown sample data. If an unknown sample replicate value is equivalent to a standard calibration value found in the MeanAtHt column 38 (FIG. 2), the latter calibration is applied to the average y-value of the replicates. Original sample weights, measured in milligrams, are calculated from values found in the Samp_Wt column 32, Samp_Vol column 34, and Dilu column 36 so that:

Original sample weight (mg)=x calculated*Samp_Vol* (Dilu/Samp_Wt/1000)

A prediction interval value 218 is calculated by inflating back-calculated x-value 200 ($S_x$) by the appropriate t-distribution value. Prediction interval value 218 is calculated using the following equation as discussed in Nester, et al.:

$$X \pm t_{(1-\alpha/2(n-2))} S_x$$

where X is the back-calculated x-value or unknown sample input measurement. n is the number of pairs of calibration data, which comprises the observed values of the calibration standards. t is the upper 1–$\alpha$/2 percentile of the t-distribution with n–2 degrees of freedom for a 95% prediction interval when $\alpha$ is set to 0.05. $\alpha$ is set to 0.01 for 99% prediction interval. The t-distribution value represents a probability value that is used to determine confidence intervals and comparison statements about the mean value(s) of the population sample or in this case the mean value(s) of the sample readings. The % confidence interval, such as 95% PI and 99% PI, for a specified parameter consists of a lower and an upper limit. The higher the confidence level the wider the confidence interval. The probability that the confidence level is incorrect, that is, does not contain the true parameter value, is expressed as $\alpha$ and assigned a value of either 0.05 or 0.01. The calculated error and degrees of freedom are statistical notations taken from Neter, et al.

The confidence level on the mean tightens by a factor of two for approximately every fourfold increase in the sample size. The sample size is selected upon both statistical and business criteria. Business criteria include cost, time and available resources. However, business factors should be weighed after the "statistically correct" sample size is determined. Statistical criteria are related to discovering the difference between a sample characteristic and reality. Detection of smaller practical differences will require larger sample sizes. The sample size has little effect on the computation of the statistical values, which is the focus of the present invention. A best estimate mean can be formed with two observations as well as with one hundred observations. The increase in sample size does affect the confidence interval. Thus, the desired width of the confidence interval is what really determines the sample size. Usually, the detection of the true mean value is desired to be within some delta ($\delta$) of the true mean ($\mu$), hence the confidence interval on $\mu$ is usually used to compute an appropriate sample size. An overview of the use of confidence intervals and population sizes in the Six Sigma program is presented by Mario Perez-Wilson in "Six Sigma—Understanding the Concept, Implications and Challenges", Mario Perez-Wilson and Advanced Systems Consultants, 1999, and by Forrest W. Breyfogle III in "Implementing Six Sigma—Smarter Solutions Using Statistical Methods", John Wiley & Sons, 1999.

The confidence intervals calculated for each unknown sample concentration measurement exceeds the information provided by classical statistical analysis. The confidence interval more accurately quantifies the weight of the unknown sample by analyzing calibration data taken from a continuous response population. The continuous response population in the exemplary embodiment of the present invention is a typical batch run containing several calibrations that were run six times.

The apparatus described above may use a hardware implementation or a combination of hardware and software. Attached is the macro listing using Microsoft Excel Implementation for a software implementation of part of the apparatus.

In the alternative, calculator 10 can be modified and utilized by other analytical instrumentation requiring additional output data for making calculations for statistical analysis using Six Sigma.

The present invention can be embodied in the form of computer-implemented processes and apparatuses for practicing those processes. The present invention can also be embodied in the form of computer program code containing instructions, embodied in tangible media, such as floppy diskettes, CD-ROMs, hard drives, or any other computer-readable storage medium, wherein, when the computer program code loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When the implementation on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for calculating at least one confidence interval value for a quantitative chemical analysis with an analytical instrument, the method comprising:

activating a calculator;

selecting an input data from the quantitative chemical analysis with the analytical instrument;

reformatting said input data into an output data;

generating a specific calibration summary using said output data;

plotting at least one linear calibration curve derived from said specific calibration summary;

plotting at least one residual calibration value plot derived from said specific calibration summary;

calculating at least one back-calculated unknown sample value; and calculating at least one confidence interval for said at least one back-calculated unknown sample value;

wherein the analytical instrument is an atomic absorption spectrophotometer.

2. A method recited in claim 1, wherein the calculator is a set of instructions, wherein said set of instructions is a macro of a spreadsheet program.

3. A method recited in claim 1, wherein reformatting said input data further comprises:

parsing said input data a first time;

parsing said input data a second time, wherein said parsing the input data a first time and a second time provides the calculator with additional data to calculate said at least one confidence interval for said at least one back-calculated x-value.

4. A method recited in claim 1, wherein plotting said at least one linear calibration curve requires at least three pairs of calibration standard measurements or at least three pairs.

5. A method recited in claim 1, wherein plotting said at least one residual calibration value plot requires at least three pairs of calibration standard measurements.

6. A method recited in claim 1, wherein said calculating said at least one back-calculated unknown sample value includes using a data derived from said at least one least squares best fit line.

7. An apparatus for calculating at least one confidence interval value, comprising a calculator having a set of instructions for calculating said at least one confidence interval value from data from an atomic absorption spectrophotometer quantitative chemical analysis.

8. An apparatus recited in claim 7, wherein the set of instructions further comprises:

an instruction to activate a calculator;

an instruction to select an input data;

an instruction to process said input data to generate an output data;

an instruction to generate a calibration summary and a specific calibration summary from said output data;

an instruction to plot at least one least-squares best fit line from said calibration summary and said specific calibration summary;

an instruction to plot at least one residual calibration value plot from said calibration summary and said specific calibration summary;

an instruction to calculate at least one back-calculated x-value for the at least one unknown sample; and an instruction to calculate said at least one confidence interval value for said at least one back-calculated x-value.

9. An apparatus recited in claim 7, wherein said instruction to calculate said at least one back-calculated x-value includes using a data derived from said at least one least squares best fit line.

10. An article of manufacture comprising:

a computer usable medium having set of instruction means embodied therein for calculating at least one confidence interval value for at least one back-calculated x-value for at least one unknown sample, an article of manufacturing comprising:

set of instruction means for causing said set of instructions to select an input data comprising at least three pairs of values based on at least three pairs of calibration standard values;

set of instruction means for causing said set of instructions to plot at least one least-squares best fit line from said output data;

set of instruction means for causing said set of instructions to plot at least one residual calibration value plot from said output data;

set of instruction means for causing said set of instructions to calculate at least one back-calculated x-value for said at least one unknown sample; and set of instruction means for causing said set of instructions to calculate at least one confidence interval value for said at least one back-calculated x-value.

11. An article of manufacture recited in claim 10, wherein said set of instructions means for causing said set of instructions to calculate said at least one back-calculated x-value includes using a data derived from said at least one least squares best fit line.

12. A system comprising:

an atomic absorption spectrophotometer; and a computer usable medium having a set of instructions for calculating at least one confidence interval from data from the atomic absorption spectrophotometer.

13. A system recited in claim 12, wherein the set of instructions further comprises:

an instruction to select an input data comprising at least three pairs of values based on at least three pairs of calibration standard values;

an instruction to reformat said input data and generate an output data comprising said at least three pairs of values based on said at least three pairs of calibration standard values;

an instruction to plot at least one least-squares best fit line from said output data;

an instruction to plot at least one residual calibration value plot from said output data;

an instruction to calculate at least one back-calculated x-value for at least one unknown sample; and an instruction to calculate at least one confidence interval value for said at least one back-calculated x-value.

14. A system recited in claim 12, wherein said instruction to calculate said at least one back-calculated x-value includes using a data derived from said at least one least squares best fit line.

15. A program storage device readable by machine, tangibly embodying a program of instructions executable by the machine to perform method steps for calculating at least one confidence interval, comprising:

activating a calculator;

selecting an input data from a quantitative chemical analysis with an analytical instrument;

plotting at least one residual calibration value plot derived from said calibration summary;

calculating at least one back-calculated unknown sample value; and calculating at least one confidence interval for said at least one back-calculated unknown sample value;

wherein the analytical instrument is an atomic absorption spectrophotometer.

* * * * *